United States Patent
Ekelin et al.

(10) Patent No.: US 8,264,963 B2
(45) Date of Patent: Sep. 11, 2012

(54) DATA TRANSFER PATH EVALUATION USING FILTERING AND CHANGE DETECTION

(75) Inventors: Svante Ekelin, Vallentuna (SE); Erik Hartikainen, Norrkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 12/303,876

(22) PCT Filed: Jun. 9, 2006

(86) PCT No.: PCT/IB2006/001538
§ 371 (c)(1),
(2), (4) Date: Mar. 13, 2009

(87) PCT Pub. No.: WO2007/129134
PCT Pub. Date: Nov. 15, 2007

(65) Prior Publication Data
US 2009/0262657 A1 Oct. 22, 2009

(30) Foreign Application Priority Data
Sep. 21, 2006 (JP) .................................. 2006-256040

(51) Int. Cl.
*H04L 12/26* (2006.01)
(52) U.S. Cl. ...................................... 370/235; 370/252
(58) Field of Classification Search ................... 370/230, 370/395.2, 235, 252; 455/63.1, 232; 379/406.08; 375/296; 708/300
See application file for complete search history.

(56) References Cited

U.S. PATENT DOCUMENTS

| 5,867,411 | A * | 2/1999 | Kumar .......................... 708/300 |
| 6,625,155 | B1 * | 9/2003 | Dziong ....................... 370/395.2 |
| 6,839,754 | B2 | 1/2005 | Nowak et al. |
| 6,952,561 | B1 * | 10/2005 | Kumar et al. ................ 455/63.1 |
| 7,602,845 | B2 * | 10/2009 | Alessandro ................... 375/232 |
| 2003/0108192 | A1 * | 6/2003 | Tanrikulu et al. ........ 379/406.08 |
| 2003/0157914 | A1 * | 8/2003 | Li et al. ......................... 455/296 |
| 2007/0115814 | A1 * | 5/2007 | Gerla et al. .................... 370/230 |

FOREIGN PATENT DOCUMENTS

| WO | WO 00/56021 A | 9/2000 |
| WO | WO 2005/076530 A1 | 8/2005 |

OTHER PUBLICATIONS

Ekelin, S et al: "Real-time measurement of end-to-end available bandwidth using Kalman filtering" 2006 10th IEEE/IFIP Network Operations and Management Symposium Apr. 3-7, 2006, Vancouver, BC, Canada, pp. 73-84, XP002400011 (IEEE Cat. No. 06CH37765C) IEEE Piscataway, NJ, USA ISBN: 1-4244-0143-7.

(Continued)

*Primary Examiner* — Anh-Vu Ly
*Assistant Examiner* — Gbemileke Onamuti

(57) ABSTRACT

If a condition in a data transfer path is modeled appropriately, then a filter-based approach can be used to provide an estimate of the condition. This permits accurate, real-time estimates of the condition with modest requirements for data processing and memory resources. Change detection can be implemented to control a parameter of the filter.

25 Claims, 4 Drawing Sheets

OTHER PUBLICATIONS

Hartikainen et al: "Tuning the Teporal Characteristics of a Kalman-Filter Method for End-to-end Bandwidth Estimation" End-To-End Monitoring Techniques and Services, 2006 4th IEEEIIFIP Workshop, [Online] (Mar. 3, 2006), XP002399912 Retrieved from the Internet: URL:http://ieeexplore.ieee.org> [retrieved on Sep. 21, 2006].

Ekelin, S. et al: "Continuous Monitoring of Available Bandwidth over a Network Path" 2nd Swedish National Computer Networking Workshop, Nov. 23, 2004, XP002399913 Karlstad, Sweden.

Welch, G. et al. An Introduction to the Kalman Filter. SIGGRAPH 2001, Course 8. Aug. 2001.

Jacobsson, K. et al. Estimation of RTT and Bandwidth for Congestion Control Applications in Communication Networks. *IEEE Conference on Decision and Control (CDC) 2004 Proceedings*, Paradise Island, Bahamas, 2004.

Jain, M. et al. Pathload: a Measurement Tool for End-to-End Available Bandwidth. In Proc. of Passive and Active Measurement workshop (PAM), 2002.

Jain, M. et al. End-to-end Available Bandwidth: Measurement Methodology, Dynamics, and Relation with TCP Throughput. In Proc. of ACM Sigcomm, 2002.

Keshav, S. A Control-Theoretic Approach to Flow Control. In Proceedings of ACM SIGCOMM '91, pp. 3-15, Zurich, Switzerland, Sep. 1991.

Kim, M. et al. SANE: Stable Agile Network Estimation. University of Michigan Department of Electrical Engineering and Computer Science. CSE-TR-432-00. 2000.

Kim, M. et al. Mobile Network Estimation. Mobile Computing and Networking (ACM MOBICOM), Rome, Italy, 2001.

Melander, B. et al. A New End-to-End Probing and Analysis Method for Estimating Bandwidth Bottlenecks. Proceedings of IEEE Globecomm '00, San Francisco, USA, Nov. 2000.

Pasztor, A. et al. The Packet Size Dependence of Packet-Pair Like Methods. in Proceedings, Tenth International Workshop on Quality of Service (IWQoS 2002), Miami Beach, USA, May 2002.

Ribeiro, V. et al. pathChirp: Efficient Available Bandwidth Estimation for Network Paths. in Proc. of Passive and Active Measurement workshop (PAM), 2003.

Shriram, A, et al. Comparison of Public End-to-End Bandwidth Estimation Tools on High-Speed Links. in Passive and Active Measurement workshop (PAM), 2005.

Coates, M. J. et al. Sequential Monte Carlo Inference of Internal Delays in Nonstationary Data Networks. IEEE Transactions on Signal Processing, 50(2); Feb. 2002.

Prasad, R. et al. Bandwidth Estimation: Metrics, Measurement Techniques, and Tools. In: IEEE Network Magazine (2003).

Willsky, A.S. et al. A Generalized *L*ikelihood Ratio Approach to the Detection and Estimation of Jumps in Linear Systems. IEEE Transactions on Automatic Control, pp. 108-112 (1976).

Chow, E.Y. Analytical Studies of the Generalized Likelihood Ratio Technique or Failure Detection. MIT Report ESL-R-645 (1976).

\* cited by examiner

CHANGE DETECTORS

DATA TRANSFER PATH EVALUATION USING FILTERING AND CHANGE DETECTION

CROSS REFERENCE TO RELATED APPLICATION

The subject matter disclosed in this application is related to subject matter disclosed in U.S. Ser. No. 11/285,723, now U.S. Pat. No. 7,778,179.

FIELD OF THE INVENTION

The invention relates generally to data networks and, more particularly, to evaluation of data transfer paths in data networks.

BACKGROUND OF THE INVENTION

The documents listed below are incorporated herein by reference:
G. Bishop, and G. Welch, "An Introduction to the Kalman Filter", SIGGRAPH 2001, Course 8.
K. Jacobsson, H. Hjalmarsson, N. Möller and K H Johansson, "Estimation of RTT and bandwidth for congestion control applications in communication networks", in *IEEE Conference on Decision and Control (CDC) 2004 Proceedings*, Paradise Island, Bahamas, 2004.
M. Jain and C. Dovrolis, "Pathload: a measurement tool for end-to-end available bandwidth". In Proc. of Passive and Active Measurement workshop (PAM), 2002.
M. Jain and C. Dovrolis, "End-to-end Available Bandwidth: Measurement Methodology, Dynamics, and Relation with TCP Throughput". In Proc. of ACM Sigcomm, 2002.
S. Keshav, A control-theoretic approach to flow control. In Proceedings of ACM SIGCOMM'91, pages 3-15, Zurich, Switzerland, September 1991.
M. Kim and B. Noble, "SANE: stable agile network estimation", University of Michigan Department of Electrical Engineering and Computer Science. CSE-TR-432-00. 2000.
M. Kim and B. Noble, "Mobile network estimation", Mobile Computing and Networking (ACM MOBICOM), Rome, Italy, 2001.
B. Melander, M. Björkman, and P. Gunningberg, "A new end-to-end probing and analysis method for estimating bandwidth bottlenecks", Proceedings of IEEE Globecomm'00, San Francisco, USA, November 2000.
A. Pásztor and D. Veitch, "The packet size dependence of packet-pair like methods", in *Proceedings, Tenth International Workshop on Quality of Service (IWQoS* 2002), Miami Beach, USA, May 2002.
V. Ribeiro, R. Riedi, R. Baraniuk, J, Navratil, L. Cottrell, "pathChirp: Efficient Available Bandwidth Estimation for Network Paths", in Proc. of Passive and Active Measurement workshop (PAM), 2003.
A. Shriram, M. Murray, Y. Hyun, N. Brownlee, A. Broido, M. Fomenkov and K C Claffy, "Comparison of Public End-to-End Bandwidth Estimation Tools on High-Speed Links", in Passive and Active Measurement workshop (PAM), 2005.
Nowak, R. D. and Coates, M. J., "Network tomography using closely spaced unicast packets", U.S. Pat. No. 6,839,754 (2005).
M. J. Coates and R. D. Nowak. "Sequential Monte Carlo inference of internal delays in nonstationary data networks", IEEE Transactions on Signal Processing, 50(2): 366-376, February 2002.
S. Ekelin and M. Nilsson, "Continuous monitoring of available bandwidth over a network path", $2^{nd}$ Swedish National Computer Networking Workshop, Karlstad, Sweden, Nov. 23-24, 2004.
Prasad, R., Murray, M., Dovrolis, C., Claffy, K C.: Bandwidth Estimation: Metrics, Measurement Techniques, and Tools. In: IEEE Network Magazine (2003).

The capability of measuring available bandwidth end-to-end over a path in a data network is useful in several contexts, including SLA (Service Level Agreement) verification, network monitoring and server selection. Passive monitoring of available bandwidth of an end-to-end network path is possible in principle, provided all of the network nodes in the path can be accessed. However, this is typically not possible, and estimation of available end-to-end bandwidth is typically done by active probing of the network path. The available bandwidth can be estimated by injecting probe traffic into the network, and then analyzing the observed effects of cross traffic on the probes. This kind of active measurement requires access to the sender and receiver hosts (nodes) only, and does not require access to any intermediate nodes in the path between the sender and receiver.

Conventional approaches to active probing require the injection of probe packet traffic into the path of interest at a rate that is sufficient transiently to use all available bandwidth and cause congestion. If only a small number of probe packets are used, then the induced transient congestion can be absorbed by buffer queues in the nodes. Accordingly, no packet loss is caused, but rather only a small path delay increase of a few packets. The desired measure of the available bandwidth is determined based on the delay increase. Probe packets can be sent in pairs or in trains, at various probe packet rates. The probe packet rate where the path delay begins increasing corresponds to the point of congestion, and thus is indicative of the available bandwidth. Probe packets can also be sent such that the temporal separation between probe packets within a given train varies, so each train can cover a range of probe rates.

Conventional solutions such as those mentioned above either do not produce real time estimates of available bandwidth, or do not produce sufficiently accurate estimates of available bandwidth, or both. These solutions also tend to require either significant data processing resources, or significant memory resources, or both.

It is therefore desirable to provide for an active probing solution that can estimate the available bandwidth of a path in a data network without the aforementioned difficulties of conventional solutions.

SUMMARY OF THE INVENTION

Exemplary embodiments of the invention provide for modeling a condition in a data transfer path appropriately to permit the use of a filter-based approach to provide an estimate of the condition. This permits accurate, real-time estimates of the condition with modest requirements for data processing and memory resources. Some embodiments implement change detection to control a parameter of the filter.

DETAILED DESCRIPTION

Figure 1:
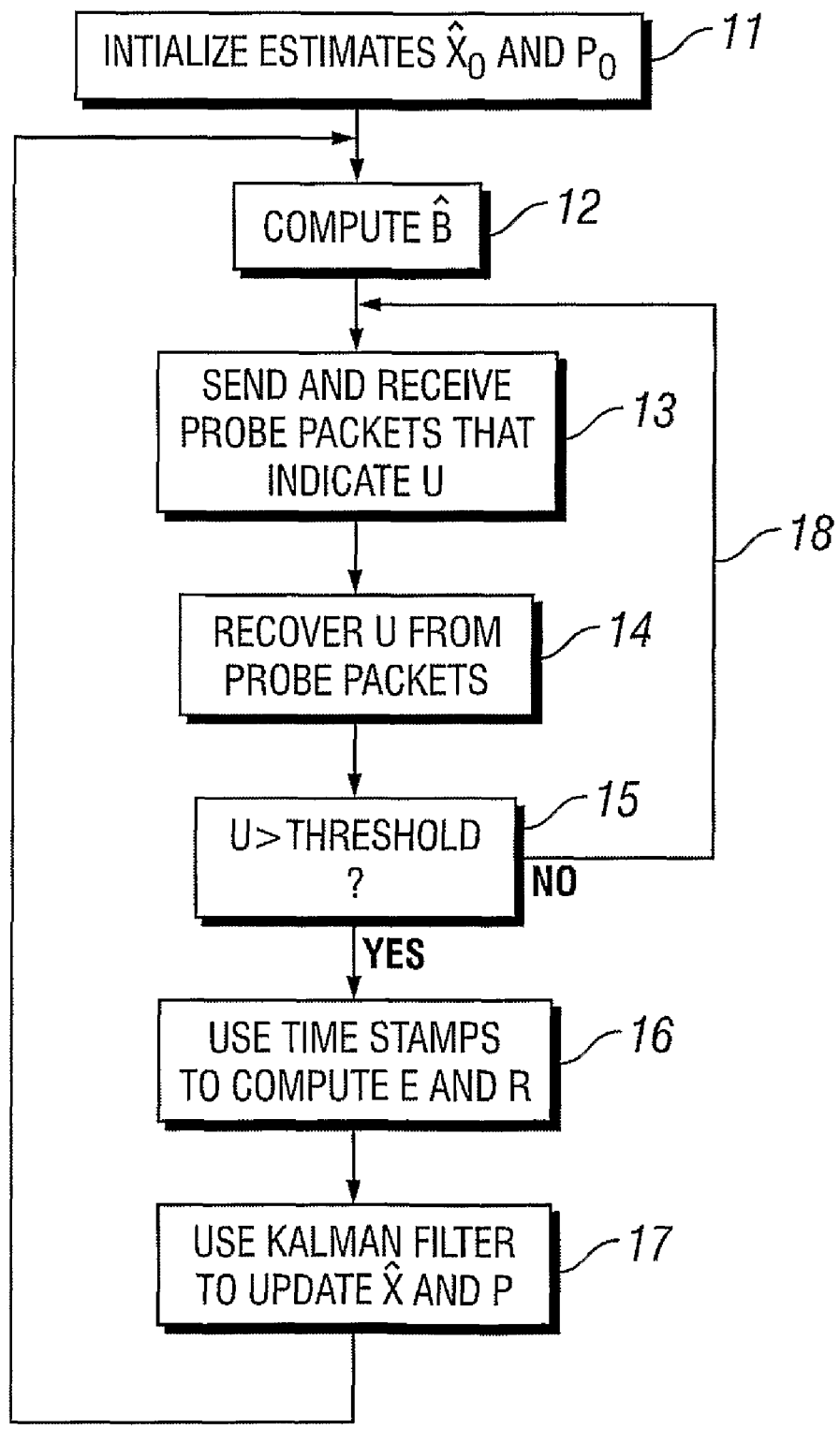
FIG. 1 illustrates exemplary operations that can be performed according to the invention.

Exemplary embodiments of the invention provide for fast and accurate estimation of a time-dependent condition associated with a packet-switched network path, for example, a path between two hosts or network nodes on the Internet or another IP network. Active probing is used in combination with filtering to estimate variables of network model related to the condition of interest. The estimate of the condition of interest is then obtained based on the estimated variables.

The properties of the network path are sampled by transmitting probe packets in a specific pattern across the network path. Their time stamps are recorded on sending and on receiving, providing a measurement of a quantity related to the network model variables. This is repeated over and over again, for as long as it is desired to keep track of the condition of interest.

The use of filtering enables real-time estimation. For each new measurement obtained by sampling the system, a new estimate of the network model variable(s) is calculated from the previous estimate and the new measurement. This in turn allows for the production of an updated estimate (i.e., the new estimate) of the condition of interest for each new sampling of the network path. The sampling (i.e., measurements) may be performed arbitrarily often, resulting in real-time responsiveness. Thus, a filter can take a previous estimate $\hat{x}_{k-1}$ of the system state and a new measurement $z_k$ as inputs, and then calculate a new estimate $\hat{x}_k$ of the system state based on those inputs. This permits the filter to produce the state variable estimates in real-time, i.e. tracking the system state.

One example of an estimating filter is the well-established Kalman filter, which is both fast and lightweight. In order to be able to apply a Kalman filter, both the system model and the measurement model need to be expressed in a linear way. That is, the new system state depends linearly on the previous system state, plus a noise term, and the measured quantity depends linearly on system state variables, plus a noise term.

Before further discussion of the filter-based approach to the estimation of system state variables, examples of a condition to be estimated and a suitable measurement technique will now be discussed.

In some embodiments of the invention, for example, the condition to be estimated is the available bandwidth of the network path. The concept of available bandwidth can be understood as follows. Each link j in a network path has a certain capacity, Cj, determined by the network interfaces in the nodes on each end of the link. The capacity Cj is simply the highest possible bit rate over the link at the packet level. The capacity typically does not vary over short time scales. However, the load, or cross traffic, on a given link j, denoted by Sj(t), does vary. The available bandwidth Bj(t) of link j is Bj(t)=Cj−Sj(t). One of links j along the path has the smallest available bandwidth. This "bottleneck link" determines the available bandwidth of the path. The available bandwidth B(t) of a network path is the minimum of the available bandwidths respectively associated with its constituent links:

$$B(t) = \min_j (Cj - Sj(t)).$$

The available bandwidth of a network path at any time t can thus be interpreted as the maximum increase in data rate, from sending end to receiving end, which can theoretically occur at time t without causing congestion.

It should be noted that cross traffic load and thus available bandwidth are defined using some averaging time scale tau, i.e. Sj(t) is calculated by averaging over some time interval of length tau around time t. There is no universal, natural choice of tau, rather this depends on the specifics of the application. Due to finite link capacity and cross-traffic packet size, tau may not be chosen arbitrarily small. However, for modern data networks, available bandwidth and cross traffic load could be defined using tau as low as in the sub-second region.

In some embodiments of the invention, the active probing used to sample for measurements is built on the well-known practice of transmitting pairs of time-stamped probe packets from sender to receiver. For example, a network path can be modeled as a series of hops, where each hop contains an input FIFO queue and a transmission link. Each transmission link j has a constant capacity Cj, and time-varying cross traffic. Consider a sequence of packets wherein the ith packet in the sequence arrives at a hop at time $\tau_i$, and arrives at the next hop at time $\tau_i^*$. Of interest are the inter-arrival times of the packet pairs. If each packet pair is defined to contain the (i−1)th packet and the ith packet of a sequence of packets, then the inter-arrival times of a given packet pair at the aforementioned hops are $$t_i = \tau_i - \tau_{i-1} \text{ and } t_i^* = \tau_i^* - \tau_{i-1}^*.$$

A dimensionless quantity, the inter-packet strain, is designated as $\epsilon$, and is defined by $$\frac{t_i^*}{t_i} = 1 + \varepsilon.$$

If u is the probe packet transmission rate selected for performing the measurement, if r is the rate of probe packet traffic exiting a hop, and if b is the size of the probe packets, then $$\frac{u}{r} = \frac{b/t_i}{b/t_i^*}$$
$$= \frac{t_i^*}{t_i}$$
$$= 1 + \varepsilon.$$

The inter-packet strain $\epsilon$ can thus be seen to provide an indication of the relationship between the probe traffic rate u and the available bandwidth B. If u is less than B, then $\epsilon=0$, and there is no congestion. However, if u reaches B, then there is congestion, and the congestion (or more exactly the strain) grows in proportion to the overload, u-B. This has been shown using a fluid model in the aforementioned document, "A new end-to-end probing and analysis method for estimating bandwidth bottlenecks", by B. Melander et al. The above-described behavior of the inter-packet strain is demonstrated in Equation 1 below.

$$\varepsilon = v + \begin{cases} 0 & (u < B) \\ \alpha(u-B) = \alpha u + \beta & (u \geq B) \end{cases} \quad (1)$$

In the model of Equation 1, $\alpha$ is a state variable equal to $1/C$, $\beta$ is a state variable equal to $(S/C)-1$, and v is measurement noise. The available bandwidth is related to the state variables as $$B = -\frac{\beta}{\alpha}.$$

Thus, an estimate of the available bandwidth can be readily obtained if the state variables $\alpha$ and $\beta$ can be estimated.

Returning now to the idea of a filter-based approach, the state of a system is estimated from repeated measurements of some quantity dependent on the system state, given models of how the system state evolves from one measurement occasion to the next, and how the measured quantity depends on the system state. Both these dependencies include a random noise term, the process noise and the measurement noise, respectively. The system equations are then $$\begin{cases} x_k = f(x_{k-1}) + w_{k-1} \\ z_k = h(x_k) + v_k \end{cases} \quad (2)$$

where x is the state of the system, z is the measurement, w is the process noise and v, is the measurement noise. The functions $f$ and h represent the system evolution model and the measurement model, respectively. The subscript refers to the "discrete time".

If the functions $f$ and h are linear, and if both the process noise and the measurement noise are Gaussian and uncorrelated, there is an optimal filter, namely the Kalman filter. Experience has shown that Kalman filters often work very well, even when these conditions are not strictly met. That is, the noise distributions do not need to be exactly Gaussian. A certain deviation from linearity of the functions $f$ and h can also be accommodated by the noise terms. Another important advantage with Kalman filters is that, unless the dimensionality of the system is very large, they are computationally light-weight, with minimal requirements on CPU and memory. In this linear case, the system can be expressed using matrices as follows:

$$\begin{cases} x_k = Ax_{k-1} + w_{k-1} \\ z_k = Hx_k + v_k \end{cases} \quad (3)$$

The Kalman filter equations allowing calculation of the new estimate from the previous estimate and the new measurement are:

$$\hat{x}_k = \hat{x}_{\bar{k}} + K_k(z_k - H\hat{x}_{\bar{k}})$$

$$P_k = (I - K_k H) P_{\bar{k}} \quad (4)$$

where $$\hat{x}_{\bar{k}} = A\hat{x}_{k-1}$$

$$P_{\bar{k}} = AP_{k-1}A^T + Q \quad (5)$$

$$K_k = P_{\bar{k}}H^T(HP_{\bar{k}}H^T + R)^{-1}. \quad (6)$$

Kalman filtering can be understood as a process where there are two phases of calculation in each iteration. First, there is a "prediction" phase, where the previous estimate evolves one discrete time step (Equation 5) according to the system model. Then, there is a "correction" phase, where the new measurement is taken into account (Equation 4). The updated error covariance matrix $P_k$ of the state estimate is also computed.

As can be seen from Equations 6 and 5, the Kalman gain $K_k$ increases with Q and decreases with R. These Kalman filter inputs Q and R are the covariances of the process noise w and measurement noise v, respectively. These quantities may be intuitively understood as follows. Large variations of the noise in the system model (high Q) means that the prediction according to the system model is likely to be less accurate, and the new measurement should be more heavily weighted. Large variations in the measurement noise (high R) means that the new measurement is likely to be less accurate, and the prediction should be more heavily weighted. Note that the measured quantity $z = \varepsilon$ is a scalar, and R is also a scalar (or a 1×1 matrix).

Exemplary embodiments of the invention make use of a Kalman filter in order to produce an updated estimate of the available bandwidth over a network path for each new measurement. Each measurement includes sending a sequence of pairs of time-stamped packets, and calculating the average inter-packet strain. In some embodiments, the sequence of packet pairs may be coalesced into a train. The variance of the inter-packet strain is also computed to produce the R input for the Kalman filter equations. In some embodiments, the probing rate u is chosen randomly for each measurement, for example, according to a probability distribution such as a uniform distribution. In some embodiments, measurements are repeated after a time interval chosen randomly for each new measurement from a probability distribution, for example, a one-point distribution, where the interval one second is chosen with probability one.

It should be noted that the Kalman filter method is very "forgiving", and good results are often produced even when the ideal conditions are slightly broken. So, even if a system displays characteristics that deviate somewhat from this piecewise linear system curve, the resulting available bandwidth estimate is not automatically invalidated. Of course, all variables in this model are dynamical, i.e. may vary in time, so they depend on the subscript (which is sometimes suppressed in this exposition).

The model of Equation 1 is not linear, but it is piecewise linear. An example of this is shown graphically in FIG. 3. Although Kalman filters are not normally applicable in such cases, this problem is circumvented according to exemplary embodiments of the invention, and efficient convergence can be obtained. Even if the piecewise linear model used is only an approximation, the Kalman filter can still produce good estimates, as the noise terms can accommodate some errors due to "mismodeling". The model of Equation 1 allows for application of a Kalman filter, when the state of the system is represented by a vector containing the two parameters of the sloping straight line part of Equation 1.

$$x = \begin{bmatrix} \alpha \\ \beta \end{bmatrix}. \quad (7)$$

Figure 3:
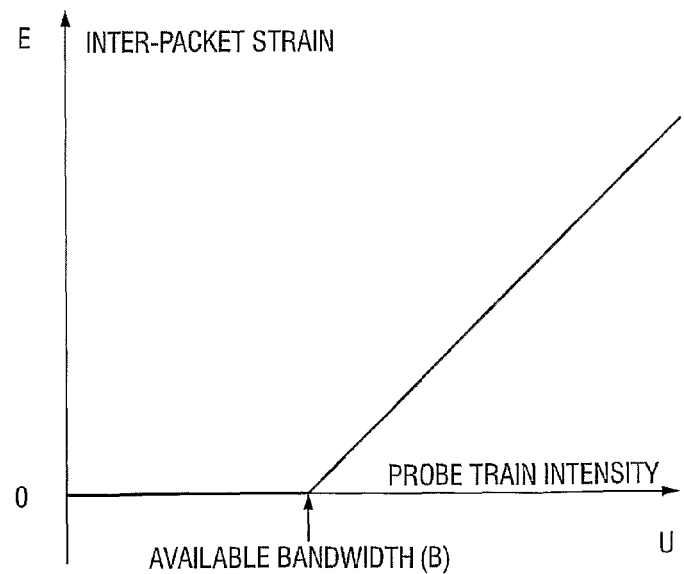
FIG. 3 graphically illustrates a piecewise linear model utilized by exemplary embodiments of the invention.

In order to fulfill the linearity criterion for applicability of Kalman filtering, some embodiments of the invention track u with respect to B, and attempt to stay on the sloping line part of Equation 1 (see also FIG. 3). Since the true value of B, the available bandwidth, is not known, exemplary embodiments of the invention use the most recent estimate $\hat{B}$, or some appropriate threshold value in the vicinity of $\hat{B}$. If u is smaller than this threshold, the measurement is disregarded and the estimate of the state vector is not updated. The measurement $\epsilon_k$ of the strain at discrete time k can be written as $$\epsilon_k = H x_k + v_k \quad (8)$$

where H=[u 1]. Also, the evolution of the system state can be written as $$x_k = x_{k-1} + w_{k-1} \quad (9)$$

Thus, the Kalman filter formalism may be applied to the state vector of Equation 7, with A=I and z=$\epsilon$, where I is the Identity matrix.

The state vector x of Equation 7 is two-dimensional, so the covariance Q of the process noise w is a 2×2 matrix. This Q matrix may be used for performance tuning, given a reference network with controlled and known traffic and thus known available bandwidth. When applied to the two-dimensional state vector of Equation 7, the Kalman equations become computationally very simple, and only a few floating-point operations are needed at each iteration. When the filter estimates the system state variables $\alpha$ and $\beta$, the estimate $\hat{B}$ of the available bandwidth B is easily calculated from the estimates $\hat{\alpha}$ and $\hat{\beta}$, as $$\hat{B} = -\frac{\hat{\beta}}{\hat{\alpha}}.$$

Exemplary operations according to the invention are described in the numbered paragraphs below. These exemplary operations are also illustrated at 11-18 in FIG. 1.

1. The receiver makes an initial estimate $\hat{x}_0$ of the state vector, and an initial estimate $P_0$ of the error covariance matrix corresponding to $\hat{x}_0$, as shown at 11. From $\hat{x}_0$, an estimate $\hat{B}$ of the available bandwidth is computed, as shown at 12.

2. The sender sends a sequence (or train) of N probe packet pairs with probe traffic intensity u, according to a desired probability distribution, as shown at 13. (In some embodiments, the probability distribution for u is chosen based on past experience or experimentation.) The N probe packet pairs are used for inter-packet strain measurement. Some embodiments send a sequence of N+1 probe packets that are used to form N pairs of probe packets. That is, the second probe packet of the first pair is also used as the first probe packet of the second pair, and so on. In some embodiments, probe packets are not shared among the probe packet pairs, so a sequence of 2N probe packets is used to form N distinct pairs of probe packets. The sender passes the current value of the probe packet traffic rate u to the receiver in the probe packets.

3. For the received sequence of probe packets, the receiver recovers the traffic intensity u from the probe packets, as shown at 14. If u exceeds a threshold value (for example, $\hat{B}$ or a value suitably chosen in the vicinity of $\hat{B}$) at 15, then the receiver uses the time stamps of the probe packets to compute the average $\epsilon$ of the N inter-packet strain values corresponding to the N pairs of packets, as shown at 16. The receiver also computes the covariance R. If u is less than or equal to the threshold value at 15, then the time-stamps of the probe packets are ignored, no update is performed, and operations return to #2 above, as shown at 18.

4. The Kalman filter uses the average inter-packet strain value and covariance matrix (if any) from operation 3 above to update the estimates of the state vector $\hat{x}$ and the error covariance matrix P, as shown at 17. From the new state vector estimate, a new estimate $\hat{B}$ of the available bandwidth is computed, as shown at 12.

5. Operations return to #2 above, and the next sequence of probe packets is generated, as shown at 13.

Figure 2:
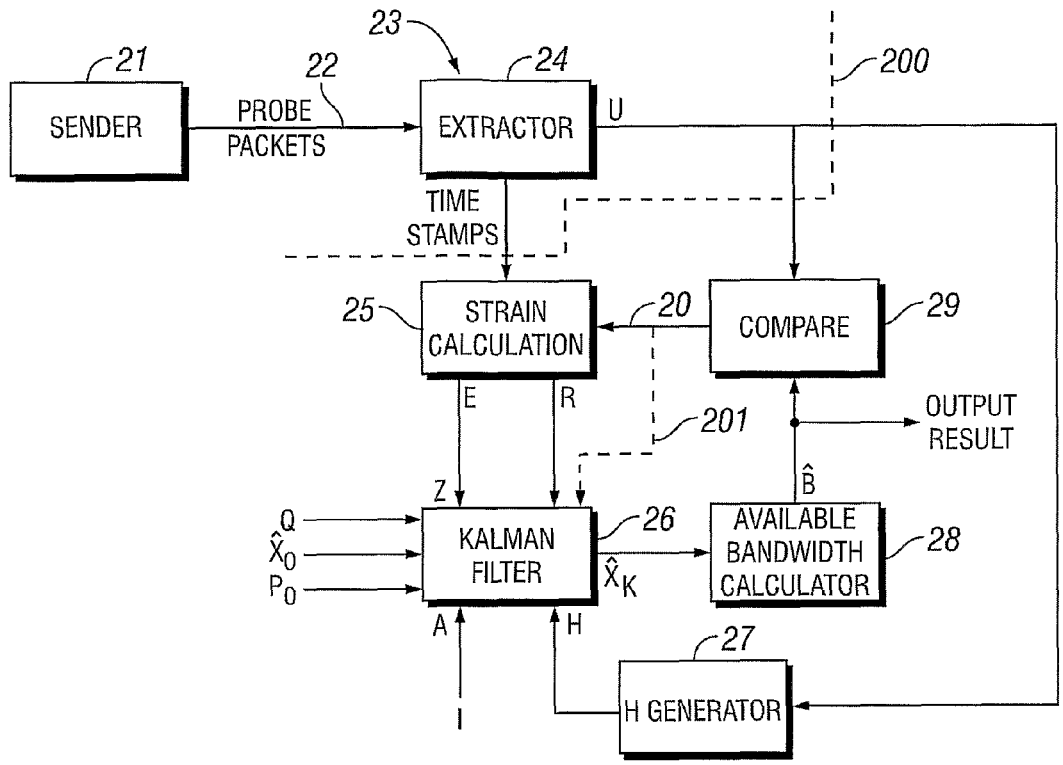
FIG. 2 diagrammatically illustrates an apparatus for evaluating a data transfer path according to exemplary embodiments of the invention.

FIG. 2 diagrammatically illustrates an apparatus for evaluating a data transfer path according to exemplary embodiments of the invention. In some embodiments, the apparatus of FIG. 2 is capable of performing operations described above and illustrated in FIG. 1. In some embodiments, the nodes 21 and 23, and the data transfer path 22, can constitute, or form a part of, a packet-switched data network, such as the Internet, a private intranet, etc. The sending node 21 sends sequences of probe packet pairs through the data transfer path 22 to the receiving node 23. The aforementioned time stamping at the sending and receiving nodes is not explicitly shown. The receiving node 23 includes an extraction unit 24 that extracts the time stamp information and the probe packet rate u from the probe packets. A strain calculation unit 25 calculates the inter-packet strain value of each pair of probe packets in the received sequence, and also calculates the average and variance of the inter-packet strain values.

The strain calculation unit 25 provides the average inter-packet strain $\epsilon$ as the z input to a Kalman filter 26, and also provides the inter-packet strain variance R as an input to the Kalman filter 26. The Kalman filter 26 also receives as inputs the Q matrix, and the initial estimates of the state vector $\hat{x}_0$ and the error covariance matrix $P_0$. In some embodiments, the initial estimates of the state vector $\hat{x}_0$ and the error covariance matrix $P_0$, are derived from past experience or experimentation. The accuracy of these initial estimates is not a significant factor in the operation of the Kalman filter.

The Kalman filter 26 receives the identity matrix I as its A matrix input, and also receives the matrix H (e.g., H=[u 1]) from a matrix generator 27 that produces matrix H in response to the probe packet rate u as extracted from the probe packets by extraction unit 24. In response to its inputs, the Kalman filter 26 produces the updated state vector estimate $\hat{x}_k$. An available bandwidth calculation unit 28 uses the updated state vector estimate to update the available bandwidth estimate $\hat{B}$. The available bandwidth estimate $\hat{B}$ is provided as an output result from the node 23, and is also provided to a compare unit 29 that compares the probe packet rate u to a threshold value that is equal to or suitably near $\hat{B}$. Depending on the result of this comparison, the compare unit 29 provides to the strain calculation unit 25 an indication 20 of whether or not the strain calculation unit 25 should make its calculations for the current sequence of probe packet pairs. In some embodiments, the indication 20 is provided to the Kalman filter 26, to signal whether or not the filter should be applied to the result of the strain calculation unit 25. This is shown by broken line 201.

From the foregoing description of FIG. 2, the extraction unit 24 and the strain calculation unit 25 can be seen as components of a data production unit that ultimately produces estimation data ($\epsilon$ and R in the example of FIG. 2) for use in estimating the available bandwidth. Also, the Kalman filter 26 and the available bandwidth estimator 28 can be seen as components of an estimation unit that applies Kalman filtering to the estimation data in order to produce the estimate of the available bandwidth.

Some embodiments are tunable to optimize the tracking performance at a desired available bandwidth-averaging time scale tau. For example, if tau=10 seconds, then the available bandwidth measurements are made over a 10-second time scale. In some embodiments, tau=10 seconds, and the 2×2 matrix Q has values of Q11=$10^{-5}$, Q12=0, Q21=0, and Q22=$10^{-3}$. In embodiments with shorter time scales, the value of Q22 may be increased, while maintaining Q11, Q12 and Q21 the same.

Some embodiments use scaling in the numerical calculations, so that the quantities involved are dimensionless. As mentioned above, $\epsilon$ is dimensionless to start with, and thus $\beta$, v and R are also dimensionless. In order to make all other quantities dimensionless, the probe traffic rate u is scaled by the maximum capacity of the first hop from the probe sender host/node. This means that u=1 is the maximum possible probing rate, and that $\alpha$, x, w and Q are dimensionless.

In some embodiments, the components at 25-29 of FIG. 2 are provided externally of and separate from the receiving node 23, but are coupled to the extraction unit 24 to receive therefrom the time stamp information and the probe packet rate u. This type of partitioning is illustrated by broken line 200 in FIG. 2. In this partitioning example, all of the components 25-29 are provided externally of and separate from the receiving node 23, for example, in one or more other nodes of the network.

The present invention can produce an updated estimate of the available bandwidth for each new sampling of the system, i.e. for each new train of probe packet pairs. The trains may be sent arbitrarily often (i.e., the time scale for the sampling measurement can be reduced arbitrarily), so the available bandwidth may be tracked in real time.

Data processing and memory requirements for performing the above-described filtering calculations can be met relatively easily. For example, in some embodiments the receiving node 23 of FIG. 2 is a microprocessor platform. The update of the available bandwidth estimate using the Kalman filter equations reduces to performing only a few floating-point operations (closer to 10 than to 100 in some embodiments).

In general, the use of the filter 26 of FIG. 2 provides a number of possibilities for tuning the filter parameters in order to achieve specific properties. Various characteristics of the filter estimates can be obtained by choosing various filter parameters. Typically, there is not one given set of filter parameters that is preferable in all possible cases. The desired behavior of the filter may vary, and therefore, so does the desirable setting of the filter parameters. For example, in some embodiments, the filter is designed solely for high agility, which is desirable if fast adaptation/tracking with respect to system changes is important. However, this also makes the filter relatively more sensitive to measurement noise. In some embodiments, the filter is designed for stability, so that the filter is relatively insensitive to measurement noise. But this makes the filter relatively slower in adapting to abrupt changes in the system state. In some embodiments, however, the filter performs sufficiently in a variety of conditions, exhibiting, for example, both a relatively low sensitivity to measurement noise, and relatively agile performance in adapting to changing conditions in the system.

As described above, the available bandwidth over a packet-switched network path typically varies with time. If the filter 26 of FIG. 2 is configured to produce high quality estimates of the available bandwidth in a network with slowly varying characteristics, then it may be relatively slow in adapting to abrupt changes in the system state. In order for the filter 26 to be appropriately responsive to rapid variations in the packet-switched network environment (which could happen, for example, due to sudden changes in cross traffic intensity and/or alternations of the bottleneck link capacity), it is desirable to provide the filter with an alternative set of filter parameters that are appropriate for fast adaptation. This is achieved in some embodiments through the use of change detection techniques.

Change detectors can improve the performance of filter-based tools that experience abrupt changes in system state. A change detector can automatically discover when the predictions of the filter face a systematic deviation from the input measurements. Based on this information, the change detector can indicate when the filter seems to be out of track. The change detector can provide the filter with a suitable alarm indication in case of poor performance due, for example, to an abrupt change in the system state. Thus, in case of an alarm, appropriate filter parameters can be temporarily adjusted from a first set of parameters that provide stability and noise insensitivity to a second set of parameters that achieve fast adaptation to the new system state. Thereafter, use of the first set of filter parameters can be resumed. Thus, there is, in general, a trade-off between the stability and the agility of the estimates; in other words, for example, a compromise between noise attenuation and tracking ability.

In embodiments that use change detection, rapid changes in the available bandwidth can be accommodated while still maintaining stability. If abrupt changes occur in the system due, for example, to sudden variations in cross traffic intensity and/or bottleneck link capacity, the change detector can automatically advise the filter to temporarily apply filter parameter tuning such that the properties of a quickly adaptive filter are obtained. In some embodiments, when there is no alarm from the change detector, the filter maintains its preconfigured filter parameters, which yield estimates suitable for a network with slowly changing characteristics; i.e. stability takes precedence over agility. In other embodiments, the reverse situation is implemented. That is, the filter is preconfigured for agility, and is selectively switched to achieve noise insensitivity temporarily, i.e., agility takes precedence over stability.

Some common change detection techniques take advantage of filter residuals. A filter residual can be interpreted as a measure of the filter's ability to predict the system state ahead of time. For example, in some embodiments, the filter residual at time k is calculated as the difference between the measurement taken at time k, and the filter's prediction (estimate) of that measurement. Other embodiments use the filter residual to produce a distance measure that is related to the filter residual, for example, producing the distance measure as a suitably normalized version of the filter residual.

Figure 4:
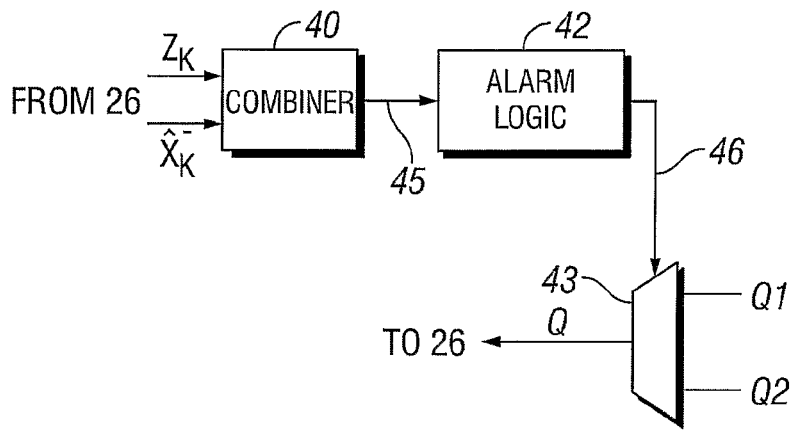
FIG. 4 diagrammatically illustrates a change detection apparatus that utilizes filter residuals according to exemplary embodiments of the invention.

FIG. 4 diagrammatically illustrates change detection logic that utilizes filter residuals according to exemplary embodiments of the invention. A combiner 40 combines the measurement for time k, namely $z_k$, and the filter's prediction (estimate) of the system state, namely $\hat{x}_{\bar{k}}$ (see also Equations 4 and 5), thereby producing combination information at 45. In some embodiments, the combination information includes a sequence of filter residuals at 45. In other embodiments, the combination information at 45 includes a sequence of distance measures related to the filter residuals. The combination information 45 is input to alarm logic 42. The alarm logic 42 performs statistical analysis with respect to the combination information 45. Based on this analysis, the alarm logic 42 decides whether or not to activate an alarm signal 46.

The alarm signal 46 controls a selector 43 that inputs filter parameters, notably the process noise covariance matrix Q to the Kalman filter 26 (see also FIG. 2). When the alarm signal 46 is active, the selector 43 passes matrix Q2 to the filter 26. Otherwise, the selector passes matrix Q1 to the filter 26. The matrix Q1 is designed to realize a filter that is generally characterized by stability and noise insensitivity, and the matrix Q2 is designed to realize a filter that is generally characterized by rapid adaptability to a new system state. In some embodiments, the diagonal elements (at row 1, column 1 and row 2, column 2) of Q1 are $10^{-5}$, and the other elements of Q1 are 0. In various embodiments, the diagonal elements (at row 1, column 1 and row 2, column 2) of Q2 take values of $10^{-2}$ or $10^{-1}$, and the other elements of Q2 are 0. In some embodiments, the measurements $z_k$ are made once per second, i.e., the discrete time interval indexed by k is one second. In various ones of the aforementioned embodiments wherein the measurement interval is one second, the alarm signal 46, once activated by alarm logic 42, remains active for a period of time that ranges from one to five of the measurement intervals, and is then inactivated by alarm logic 42.

Some embodiments exploit the fact that a sequence 45 of filter residuals (or corresponding distance measures) can generally be expected to resemble white noise in the absence of an abrupt change in the system state. If an abrupt change occurs, one or more statistical characteristics (e.g., the mean and/or variance) associated with the sequence of residuals (or corresponding distance measures) will change in correspondingly abrupt fashion, and this change in the statistical characteristic(s) can be detected by the alarm logic 42. This is commonly referred to as a whiteness test, because the alarm logic 42 detects deviations from the white noise characteristic that the sequence 45 is expected to exhibit.

As mentioned above, some embodiments use a distance measure that is computed as a suitably normalized representation of the corresponding filter residual at time k, for example:

$$s_k = \frac{z_k - H_k \hat{x}_k^-}{\sqrt{H_k P_k^- H_k^T + R_k}} \quad (10)$$

The numerator of the exemplary distance measure $s_k$ represents the filter residual at time k. The denominator normalizes the filter residual to unit variance. The expression under the radical sign in the denominator is the same as the expression in parentheses in Equation 6 above (the equation that defines the Kalman gain $K_k$). In some embodiments, the distance measure $s_k$ is used to build up the following test statistic for time k:

$$g_k^{pos} = \max(g_{k-1}^{pos} + s_k - v, 0)$$

alarm if $g_k^{pos} > h$ \quad (11)

This test statistic, commonly referred to as a cumulative sum (CUSUM) test statistic, is an example of a statistic that can be used to implement a whiteness test. The CUSUM test statistic detects an upward systematic trend of the filter residual z−Hx. The test statistic is initialized at $g_0 = 0$. In Equation 11, v is used to designate a design parameter known as the drift parameter. If the distance measure $S_k$, is smaller than the drift v, then the distance measure will not contribute to the test statistic. The chosen value of v is an indicator for what can be considered as normal/random deviation between the measurement and the prediction. After each iteration, i.e., after each discrete time step, a stopping rule is applied. The stopping rule, shown above immediately below Equation 11, compares the test statistic to a threshold h. If the test statistic exceeds the threshold h, then an alarm is issued.

Because the distance measure $s_k$ can be either positive or negative, some embodiments use a two-sided CUSUM test. The two-sided test uses the negative test statistic defined below by Equation 12, together with the associated stopping rule shown immediately below Equation 12, in combination with the positive test statistic and stopping rule associated with Equation 11, so that both upward and downward systematic trends of the filter residual can be tracked:

$$g_k^{neg} = \min(g_{k-1}^{neg} + s_k + v, 0)$$

alarm if $g_k^{neg} < -h$ \quad (12)

The above-described design parameters h and v affect the performance of the CUSUM test in terms of false alarm rate (FAR) and mean time to detection (MTD). Various embodiments use various design parameter values, depending on what requirements are to be fulfilled. For example, in various embodiments, the drift parameter v is tales values in a range from approximately $10^{-4}$ to approximately 10 (depending on the chosen threshold value h and other aspects such as the desired FAR and MTD). In various embodiments, the threshold parameter h takes values in a range from approximately $10^{-3}$ to approximately 40 (depending on the chosen drift value v and other aspects such as the desired FAR and MTD). Some embodiments use the following design parameter values: drift v=0.5; and threshold h=10. The stopping rule signals an alarm if the test statistic $g_k$ exceeds the specified threshold h (or −h). In various embodiments, the positive test statistic and the negative test statistic use different values for their respective drift parameters and/or for their respective threshold parameters.

Figure 5:
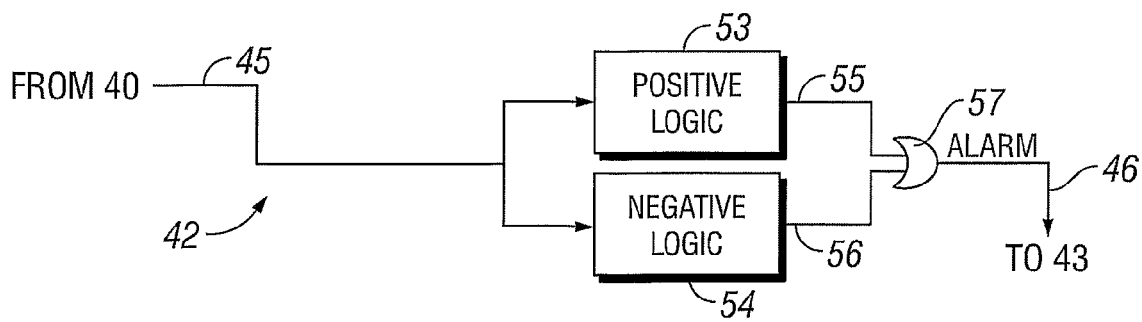
FIG. 5 diagrammatically illustrates the alarm logic of FIG. 4 in more detail according to exemplary embodiments of the invention that implement a cumulative sum test.

FIG. 5 diagrammatically illustrates in more detail the alarm logic 42 of FIG. 4 according to exemplary embodiments of the invention that implement the cumulative sum test described above. At 45, a sequence of the aforementioned distance measures $s_k$ is received from the combiner 40 (see also FIG. 4), and is passed to positive logic 53 and negative logic 54. The positive logic 53 computes the positive test statistic of Equation 10, and implements the corresponding positive threshold test. The negative logic 54 computes the negative test statistic of Equation 11 and implements the corresponding negative threshold test. If either the positive logic 53 or the negative logic 54 triggers an alarm, at 55 or 56, respectively, then the alarm signal 46 (see also FIG. 4) is activated by OR logic 57. The positive logic 53 and negative logic 54 operate concurrently to detect any new trend (e.g., any consistent deviation from expectance value 0).

Figure 6:
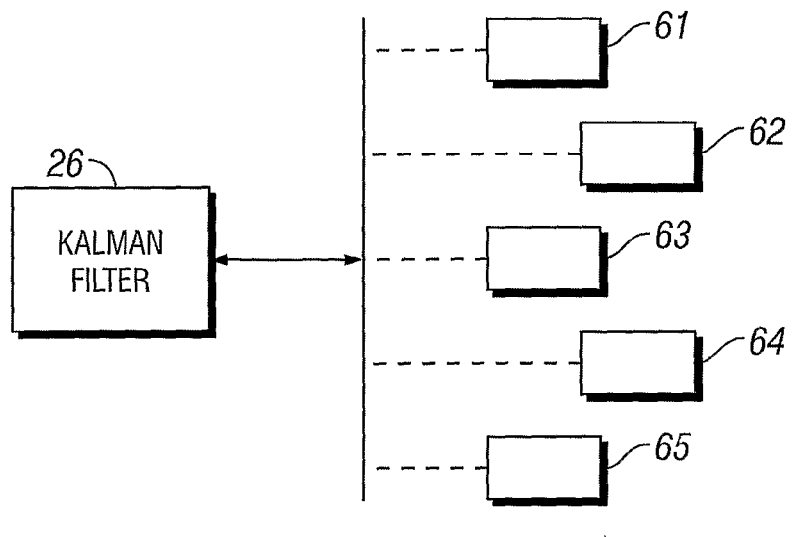
FIG. 6 diagrammatically illustrates further change detection techniques that are utilized according to exemplary embodiments of the invention.

Various change detectors are implemented in various embodiments of the invention. Examples of such embodiments are diagrammatically illustrated in FIG. 6. The broken lines in FIG. 6 illustrate that embodiments use various types of change detectors in conjunction with the filter 26 (see also FIG. 2). FIG. 6 illustrates various embodiments that implement various change detection techniques, such as ratios and marginalization of likelihoods 61, sliding windows 62, filter banks 63, multiple models 64, and algebraical consistency tests 65.

A number of the change detectors shown in FIG. 6 can also be included in the family of statistical change detection techniques that use hypothesis testing. One of these techniques is the Generalized Likelihood Ratio (GLR) test. The GLR test is well known in the art of change detection, as described, for example, in the following documents, which are incorporated herein by reference: A. S. Willsky and H. L. Jones, "A generalized likelihood ratio approach to the detection and estimation of jumps in linear systems", *IEEE Transactions on Automatic Control*, pages 108-112 (1976); and E. Y. Chow, "Analytical Studies of the Generalized Likelihood Ratio Technique for Failure Detection", MIT Report ESL-R-645 (1976). The GLR test employs parallel filters and delivers an estimate of the time and magnitude of the change. The GLR test makes use of a likelihood-ratio measure as the test statistic, which is used for deciding whether or not a change has occurred. The likelihood ratio has, for certain applications, been shown to be the optimal test statistic when testing a hypothesis $H_0$ that no change has occurred against a hypothesis $H_1(\theta, v)$ that a change of known magnitude v occurred at a change time. In this case, $H_0$ and $H_1$ are simple hypotheses and the Likelihood Ratio (LR) test is used to decide between them.

The GLR test is an extension of the LR test to include composite hypotheses (where the simple hypothesis $H_0$ is tested against several alternate hypotheses, i.e. $H_1$ is a composite hypothesis, one for each change time $\theta$). The GLR test basically compares the highest likelihoods that are obtainable under the respective hypotheses. This can be seen as estimating a parameter using a maximum likelihood estimator under the pair-wise comparison of different $H_1$ and the hypothesis $H_0$, and using the estimated parameter to construct and apply a regular likelihood test. The hypotheses are:

$H_0$: no change
$H_1(\theta,v)$: a change of magnitude v at time $\theta$ where v and $\theta$ are unknown (to be inferred by the method).

For clarity and convenience of exposition, the following description of the GLR test uses the notational convention of placing the arguments associated with the various signals in parentheses, rather than continuing with the subscript notation used in Equations 1-10 above. The GLR test makes use of a maximization over both v and $\theta$, and the obtained estimates are used in a regular LR test, where the log likelihood ratio is compared to a chosen decision threshold. Thus, the GLR test decides that a change has occurred if any of a plurality of calculated values of a test statistic exceeds a threshold value. The threshold value in the GLR test determines how much more likely the alternative hypothesis $H_1$ must be before it is chosen over the null hypothesis $H_0$.

The GLR test statistic can be defined as:

$$l = 2\log \frac{p((\gamma(1), \ldots, \gamma(k)) \mid H_1)}{p((\gamma(1), \ldots, \gamma(k)) \mid H_0)} \quad (13)$$

where $\gamma(1), \ldots, \gamma(k)$ are the filter residuals at discrete times 1 . . . k, respectively. These filter residuals are the same as defined by the numerator in Equation 10 above.

The test statistic l is a function of the latest time under consideration, k (which is known), as well as the change magnitude v and change time $\theta$ (both of which are unknown). In Equation 13, the likelihoods for the observed sequence of filter residuals $(\gamma(1), \ldots, \gamma(k))$ at times 1 . . . k, under the hypotheses $H_0$ and $H_1$, respectively, are represented as conditional probability densities.

In some embodiments, the test statistic l is calculated as:

$$l(k, \theta) = d^T(k, \theta) \cdot C^{-1}(k, \theta) \cdot d(k, \theta)$$

-continued where $$d(k, \theta) = \sum_{j=\theta}^{k} G^T(j, \theta) \cdot V^{-1}(j) \cdot \gamma(j).$$

With respect to the matrix $V^{-1}$ in $d(k,\theta)$, note that the corresponding matrix V is defined by the expression in parentheses in Equation 6 above (the equation for the Kalman gain), and is available from the filter 26. With respect to the matrix $G^T$ in $d(k,\theta)$, the corresponding matrix G represents the effect on the filter residual at time j given a sudden change v in the system state at time $\theta$, and can be defined as follows:

$G(j,\theta)=0$ for $j<\theta$ $G(j,\theta)=H(j)\cdot[A(j,\theta)-A(j,j-1)\cdot F(j-1, \theta)]$ for $j \geq \theta$ From the foregoing filter design discussion, recall that A=I at all discrete times j. Also with respect to $G(j,\theta)$, F can be defined as follows:

$$F(n, \theta) = 0 \text{ for } n < \theta$$

$$F(n, \theta) = \sum_{i=\theta}^{n} \rho(n, i) \cdot K(i) \cdot H(i) \cdot A(i, \theta) \text{ for } n \geq \theta.$$

In $F(n,\theta)$, K corresponds to the Kalman gain defined above in Equation 6. Also in $F(n,\theta)$, H can be defined as $H(n)=[u(n)\ 1]$, where u(n) is the probe traffic rate at time n, as described hereinabove, so H(n) is available from the filter 26. Further in $F(n,\theta)$, $\rho(n,i)$ can be defined as $\rho(n,i)=\rho(n-1)\cdot\rho(n-2)\cdot K\cdot\rho(i),$ where, e.g., $\rho(n-1)=[I-K(n)\cdot H(n)]\cdot A(n-1)$,
or more explicitly, $\rho(m)=[I-K(m+1)\cdot H(m+1)]\cdot A(m)$.

Thus, the components of $\rho$ as contained in $F(n,\theta)$ are known or available from the filter 26. Therefore, all information needed to compute $F(n,\theta)$, and thus $G(j,\theta)$, is available from the filter 26. Recalling that V is available from the filter 26, all information needed to compute $d(k,\theta)$ is available from the filter 26.

The remaining component of $l(k,\theta)$, the matrix $C^{-1}(k,\theta)$, is the error covariance matrix of the maximum likelihood estimate $\hat{v}$, which describes the change at time $\hat{\theta}$. It is the inverse of the change information matrix:

$$C(k, \theta) = \sum_{j=\theta}^{k} G^T(j, \theta) \cdot V^{-1}(j) \cdot G(j, \theta)$$

Accordingly, all information needed to calculate $C(k,\theta)$ is available from the filter 26. Thus, inasmuch as $d(k,\theta)$ and $C(k,\theta)$ can be computed from information that is known and/or available from the filter 26, $l(k,\theta)$ can be computed from known and/or available information.

In some embodiments, at each discrete time k, a test statistic $l(k,\theta)$ is calculated for each value of $\theta$ within a range of interest. In some embodiments, the range of interest for $\theta$ is $1 \leq \theta \leq k$. More generally, in various embodiments, the range of interest for $\theta$ is $k-M \leq \theta \leq k-N$, where M and N define a desired window of time for the change detection analysis. It can be seen that the aforementioned range $1 \leq \theta \leq k$ corresponds to $M=k-1$ and $N=0$. The test statistic having the maximum value in the calculated set is chosen, and is compared to a threshold value. If the maximum value exceeds the threshold value, then an alarm is issued. As described above with respect to the CUSUM threshold, the GLR threshold can be seen as a trade-off between FAR and MTD. In some embodiments, therefore, the threshold is selected based on aspects such as the desired FAR and MTD. As examples, threshold values such as 5, 10, 15, etc., are used in various embodiments.

The most likely change time is given by $$\hat{\theta}(k) = \arg\max_{1 \leq \theta \leq k} l(k, \theta),$$

and the most likely change at time $\hat{\theta}(k)$ is given by $$\hat{v} = C^{-1}(k, \hat{\theta}(k)) \cdot d(k, \hat{\theta}(k)).$$

It can be shown that the test statistic $l(k,\theta,v)$ under the null hypothesis exhibits a $\chi^2$ distribution. Therefore, given a desired confidence level, a suitable threshold can in principle be estimated using statistical tables.

Figure 7:
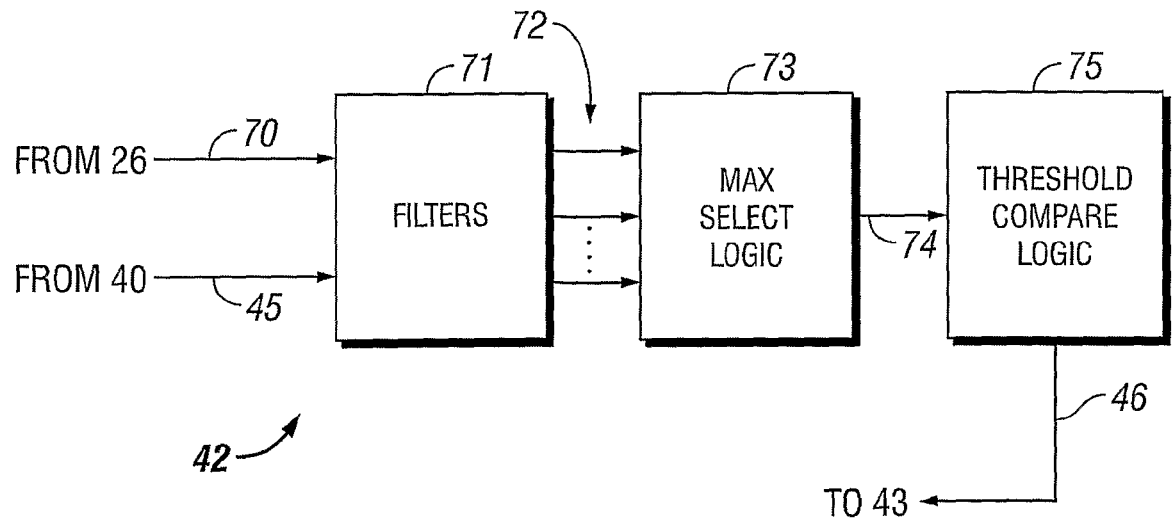
FIG. 7 diagrammatically illustrates the alarm logic of FIG. 4 in more detail according to exemplary embodiments of the invention that implement a Generalized Likelihood Ratio test.

FIG. 7 diagrammatically illustrates in more detail the alarm logic 42 of FIG. 4 according to exemplary embodiments of the invention that implement the GLR test described above. In FIG. 7, the alarm logic 42 includes filter logic 71, for example, a plurality of parallel filters as indicated. For a given discrete time k, each of the parallel filters produces the test statistic $l(k,\theta)$ for a respectively corresponding value of $\theta$ within the range of interest for $\theta$. Thus, a total of M−N+1 parallel filters are used to implement a range of k−M≦θ≦k−N. Each of the filters receives the residuals 45 from the combiner 40 (see also FIG. 4), and further receives from the filter 26 the remaining information (described in detail above and designated generally at 70 in FIG. 7) needed to compute the associated test statistic $l(k,\theta)$. The M−N+1 filters at 71 output M−N+1 test statistics $l(k,\theta)$, designated generally at 72. At 73, maximum select logic selects the maximum value from among the M−N+1 test statistics $l(k,\theta)$, and outputs this maximum value test statistic at 74. Threshold compare logic 75 compares the maximum value test statistic 74 to a threshold value. If the maximum value test statistic 74 exceeds the threshold value, then the threshold compare logic 75 activates the alarm signal 46 (see also FIG. 4).

The Marginalized Likelihood Ratio (MLR) test is a change detection technique that is related to the GLR technique and is applicable in generally the same situations where GLR is applicable. In the MLR test, the change magnitude is considered as a stochastic nuisance parameter that is eliminated by marginalization, instead of estimation as in the GLR test.

In some embodiments, the change detection apparatus (e.g., any of those shown in FIGS. 4-7) is implemented in the same network node as is the filter 26 of FIG. 2. In other embodiments, the change detection apparatus is implemented in a network node (or nodes) other than the network node (or nodes) in which the filter 26 is implemented, and all of the implicated nodes are coupled appropriately to support the communications shown in and described with respect to FIGS. 4-7.

Workers in the art will note that the above-described embodiments of the invention are applicable in many areas, two examples of which are network monitoring and adaptive applications. For example, network operators can use the invention to reliably monitor the state of their networks. As a practical example, if a transmission link goes down or the traffic load suddenly changes, it is desirable for operators to receive a fast and evident indication of the event, so that suitable action can be taken. As an example in the area of adaptive applications, audio/video applications in end hosts can use filter-based bandwidth estimation in order to dynamically adapt the codec to current end-to-end bandwidth availability. The performance can be enhanced by the above-described capability of rapidly adapting to sudden changes in the network.

It will be evident to workers in the art that, in various embodiments, the invention can be implemented in hardware, software, or a combination of hardware and software.

Although exemplary embodiments of the invention have been described above in detail, this does not limit the scope of the invention, which can be practiced in a variety of embodiments.

What is claimed is:

1. An apparatus for evaluating available bandwidth in a data transfer path that transfers data between data communication nodes of a data network, comprising:

a filter for coupling to the data transfer path, said filter configured to perform a filter operation during real-time operation of the data transfer path to produce real-time information for use in estimating the available bandwidth, wherein the available bandwidth at any time t is a maximum increase in data rate between the data communication nodes which can theoretically occur at time t without causing congestion, according to $$B(t) = \min_j (Cj - Sj(t))$$

where:
B(t)=the available bandwidth at time (t);
Cj=highest possible bit rate at packet level over link j in the data transfer path;
Sj(t)=load on given link j at time (t);

logic coupled to said filter for analyzing said real-time information;

an adjuster comprising a selector coupled to said logic and said filter for selectively adjusting said filter operation in response to said logic, by selecting filter parameters from a first set of filter parameters that provide stability and noise insensitivity, or from a second adaptive set of filter parameters that provide a fast adaptation to a new system state; and a change detector for providing an alarm indication to the selector at an abrupt change in the system state, wherein the filter parameters are adjusted temporarily from the first set of filter parameters to the second adaptive set of filter parameters.

2. The apparatus of claim 1, wherein said real-time information includes real-time parameter estimates for use in estimating the available bandwidth, and wherein said filter operation uses real-time measurements which are related to the available bandwidth and which respectively correspond to said real-time parameter estimates, said logic including a combiner for combining said real-time measurements with the respectively corresponding real-time parameter estimates to produce combination information, and said logic configured to statistically analyze said combination information.

3. The apparatus of claim 2, wherein said combination information is indicative of respective comparisons of said real-time measurements to the respectively corresponding real-time parameter estimates.

4. The apparatus of claim 2, wherein said logic is configured to apply a whiteness test with respect to said combination information.

5. The apparatus of claim 2, wherein said logic is configured to apply a cumulative sum test with respect to said combination information.

6. The apparatus of claim 2, wherein said logic is configured to apply a Generalized Likelihood Ratio test with respect to said combination information.

7. The apparatus of claim 2, wherein said logic includes a plurality parallel filters.

8. The apparatus of claim 3, wherein said logic is configured to compute a test statistic based on said combination information, and to compare said test statistic to a threshold.

9. The apparatus of claim 3, wherein said logic is configured to compute a plurality of test statistics based on said combination information, select one of said test statistics having a maximum value among said test statistics, and compare said one test statistic to said threshold.

10. The apparatus of claim 8, wherein said logic is configured to analyze a relationship between first and second likelihoods, wherein said first likelihood is a likelihood that said combination information is indicative of a first real-time characteristic of the available bandwidth, and wherein said second likelihood is a likelihood that said combination information is indicative of a second real-time characteristic of the available bandwidth.

11. The apparatus of claim 8, wherein said logic is configured to detect whether a change in a statistical characteristic associated with said combination information has occurred.

12. The apparatus of claim 1, wherein said adjuster is configured to adjust said filter operation to temporarily increase responsiveness thereof to changes in the available bandwidth.

13. The apparatus of claim 1, wherein said filter includes a Kalman filter, and said adjuster is configured to adjust a process noise covariance parameter provided to said Kalman filter.

14. The apparatus of claim 1, wherein said logic is provided physically separately from said filter at a location physically remote from said filter.

15. A method of evaluating bandwidth in a data transfer path that transfers data between data communication nodes of a data network comprising:
during real-time operation of the data transfer path, using a filter operation to produce real-time information for use in estimating the available bandwidth at a rate at which input data is received;
analyzing said real-time information to determine an estimate of the available bandwidth, wherein the available bandwidth at any time t is a maximum increase in data rate between the data communication nodes which can theoretically occur at time t without causing congestion, according to;

$$B(t) = \min_j (Cj - Sj(t))$$

where:
B(t)=the available bandwidth at time (t);
Cj=highest possible bit rate at packet level over link j in the data transfer path;
Sj(t)=load on given link i at time (t);
selectively adjusting input parameters to the filter operation in response to said analyzing, by selecting filter parameters from a first set of filter parameters that provide stability and noise insensitivity, or from a second, alternative, set of filter parameters that provide a fast adaptation to a new system state;
detecting changes in the system state; and adjusting the filter parameters temporarily from the first set of filter parameters to said second set of filter parameters, in case of an abrupt change.

16. The method of claim 15, wherein said real-time information includes real-time parameter estimates for use in estimating the available bandwidth, and wherein said filter operation uses real-time measurements which are related to the available bandwidth and which respectively correspond to said real-time parameter estimates, said analyzing including combining said real-time measurements with the respectively corresponding real-time parameter estimates to produce combination information, and said analyzing including statistically analyzing said combination information.

17. The method of claim 16, wherein said combination information is indicative of respective comparisons of said real-time measurements to the respectively corresponding real-time parameter estimates.

18. The method of claim 16, wherein said analyzing includes applying a cumulative sum test with respect to said combination information.

19. The method of claim 16, wherein said analyzing includes applying a Generalized Likelihood Ratio test with respect to said combination information.

20. The method of claim 16, wherein said analyzing includes performing parallel filtering with respect to said combination information.

21. The method of claim 17, wherein said analyzing includes computing a test statistic based on said combination information, and comparing said test statistic to a threshold.

22. The method of claim 21, wherein said analyzing includes analyzing a relationship between first and second likelihoods, wherein said first likelihood is a likelihood that said combination information is indicative of a first real-time characteristic of the available bandwidth, and wherein said second likelihood is a likelihood that said combination information is indicative of a second real-time characteristic of the available bandwidth.

23. The method of claim 21, wherein said analyzing includes detecting whether a change in a statistical characteristic associated with said combination information has occurred.

24. The method of claim 15, wherein said adjusting includes adjusting said filter operation to temporarily increase responsiveness thereof to changes in the available bandwidth.

25. The method of claim 15, wherein said using includes using a Kalman filter to perform said filter operation, and said selectively adjusting includes selectively adjusting a process noise covariance parameter provided to the Kalman filter.

* * * * *